US010222912B2

(12) United States Patent
Hristov et al.

(10) Patent No.: US 10,222,912 B2
(45) Date of Patent: Mar. 5, 2019

(54) TOUCH SENSOR WITH TOUCH OBJECT DISCRIMINATION

(75) Inventors: Luben Hristov Hristov, Sofia (BG); Stephan Thaler, Buchloe (DE)

(73) Assignee: Atmel Corporation, Chandler, AZ (US)

(*) Notice: Subject to any disclaimer, the term of this patent is extended or adjusted under 35 U.S.C. 154(b) by 0 days.

(21) Appl. No.: 13/226,059

(22) Filed: Sep. 6, 2011

(65) Prior Publication Data
US 2013/0057503 A1 Mar. 7, 2013

(51) Int. Cl.
G06F 3/045 (2006.01)
G06F 3/044 (2006.01)

(52) U.S. Cl.
CPC .................... G06F 3/044 (2013.01)

(58) Field of Classification Search
CPC .................. G06F 3/044; G06F 3/047
USPC ................................. 345/173–184
See application file for complete search history.

(56) References Cited

U.S. PATENT DOCUMENTS

| 6,744,426 | B1* | 6/2004 | Okamoto et al. ............. 345/179 |
| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2002/0185999 | A1* | 12/2002 | Tajima ............... G06F 3/011 324/76.75 |
| 2009/0135148 | A1* | 5/2009 | Bytheway ................ 345/173 |
| 2009/0315854 | A1 | 12/2009 | Matsuo |
| 2011/0007037 | A1* | 1/2011 | Ogawa ................ 345/179 |
| 2012/0127114 | A1* | 5/2012 | Weaver et al. ............. 345/174 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

Primary Examiner — Christopher E Leiby
(74) Attorney, Agent, or Firm — Baker Botts L.L.P.

(57) ABSTRACT

In one embodiment, a method includes conducting a first signal to a first source electrode external to a touch sensor. The first source electrode is capacitively coupled to the touch sensor through a touch object. The method further includes measuring a mutual capacitance between the first source electrode and the first measuring electrode. The method further includes identifying, based at least in part on the measured mutual capacitance and using a controller of the touch sensor, the touch object touching the touch sensor at a detected touch position.

17 Claims, 4 Drawing Sheets

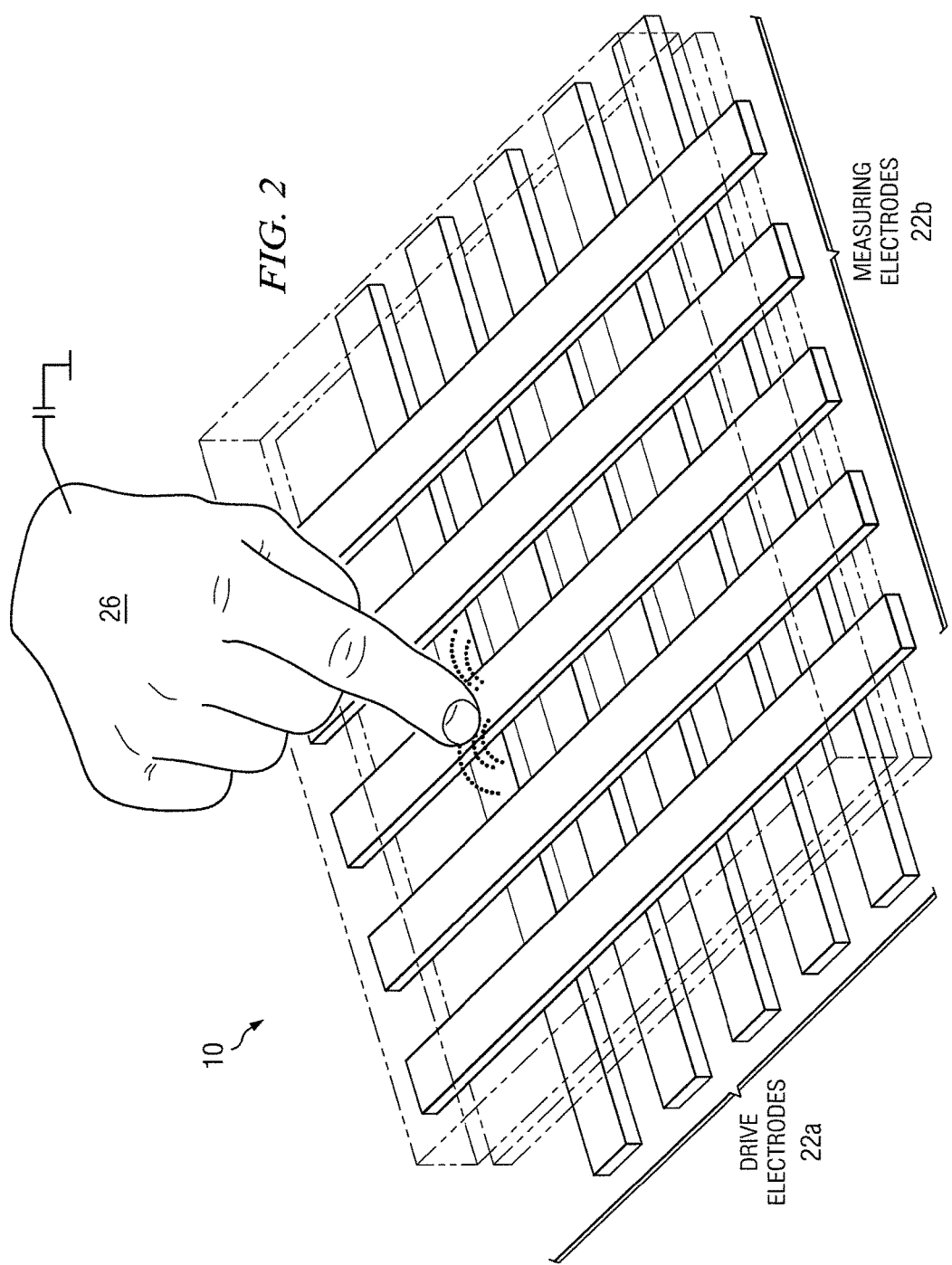

TOUCH SENSOR WITH TOUCH OBJECT DISCRIMINATION

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid, for example, on a display screen. In a touch-sensitive-display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine the touch position(s) on the touch screen.

BRIEF DESCRIPTION OF THE DRAWINGS

FIG. 2 illustrates a portion of the example device of FIG. 1 configured according to a position-detection mode of operation.

DESCRIPTION OF EXAMPLE EMBODIMENTS

Figure 1:
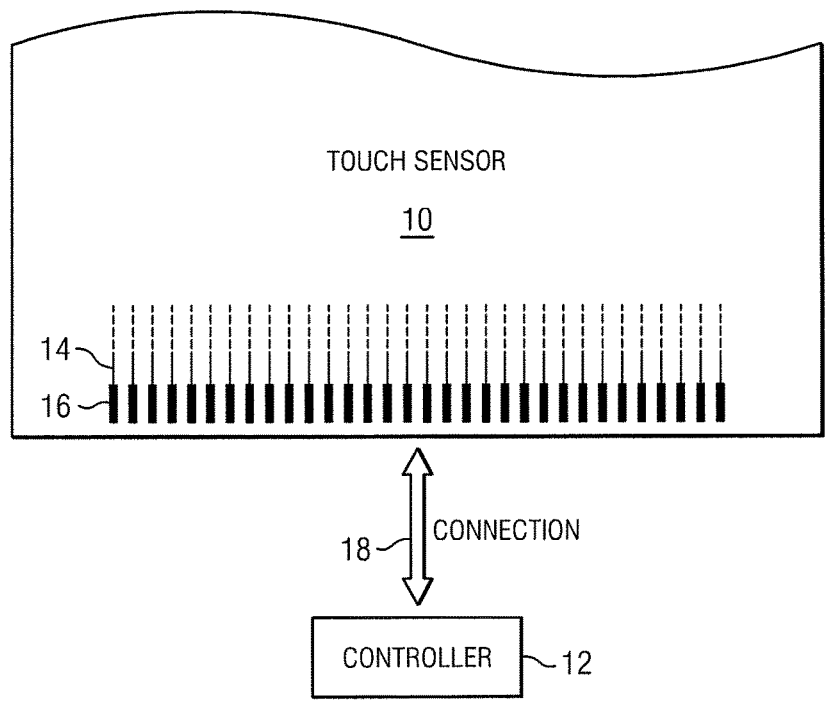
FIG. 1 illustrates an example device with a touch-sensitive area.

FIG. 1 illustrates an example touch sensor 10 with an example controller 12. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. In addition, as explained further below, for each detected presence and location of a touch or the proximity of an object within a touch-sensitive area of touch sensor 10, certain embodiments disclosed herein may be configured to identify that touch object.

Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type (e.g. sense)) disposed on a substrate, which may be a dielectric material.

An electrode (whether a drive electrode or a sense electrode) may be an area of conductive material forming a shape, such as for example a disc, square, rectangle, other suitable shape, or suitable combination of these. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 50% of the area of its shape. As an example and not by way of limitation, an electrode may be made of ITO and the ITO of the electrode may occupy approximately 50% of the area of its shape in a hatched, mesh, or other suitable pattern. In particular embodiments, the conductive material of an electrode may occupy approximately 5% of the area of its shape. As an example and not by way of limitation, an electrode may be made of fine lines of metal or other conductive material (such as for example copper, silver, or a copper- or silver-based material, carbon nano tubes, nikel, cadmium, gold, etc.) and the fine lines of conductive material may occupy approximately 5% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes or the means of electrically isolating or physically separating the shapes from each other) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm (including the conductive material forming the drive or sense electrodes); the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type (e.g. sense) that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have a single-layer configuration, with drive and sense electrodes disposed in a pattern on one side of a substrate. In such a configuration, a pair of drive and sense electrodes capacitively coupled to each other across a space between them may form a capacitive node. In a single-layer configuration for a self-capacitance implementation, electrodes of only a single type (e.g. sense) may be disposed in a pattern on one side of the substrate. As an alternative to a single-layer configuration, touch sensor 10 may have a two-layer configuration, with drive electrodes disposed in a pattern on one side of a substrate and sense electrodes disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be made of the same material as tracks 14 and may be bonded to the FPC using an anisotropic conductive film (ACF). Connection 18 may include conductive lines on the FPC coupling controller 12 to bond pads 16, in turn coupling controller 12 to tracks 14 and to the drive or sense electrodes of touch sensor 10. This disclosure contemplates any suitable connection 18 between controller 12 and touch sensor 10.

FIG. 2 illustrates one embodiment of a portion of the touch sensor 10 of FIG. 1 that includes at least two electrodes 22a and 22b configured according to a position-detection mode of operation. While operating in the position-detection mode, touch sensor 10 may be configured to determine a position of a touch object 26 (e.g. a portion of a human hand, a stylus, etc.). When operating in the position-detection mode, electrodes 22a and 22b may be configured in a manner substantially similar to the drive and sense electrodes, respectively, described above with reference to FIG. 1, and touch object 26 may be capacitively coupled to ground. In certain embodiments, touch sensor may determine the touch position at least in part by using controller 12 to apply a pulsed or alternating voltage to electrode 22a, which may induce a charge on electrode 22b. When touch object 26 touches or comes within proximity with an active area of touch sensor 10, a change in capacitance may occur, as shown by the electric field lines in FIG. 2. The change in capacitance may be sensed by electrode 22b and measured by controller 12. By measuring changes in capacitance throughout an array of electrodes 22, controller 12 may determine the position of the touch or proximity within the touch-sensitive area(s) of touch sensor 10.

Figure 3:
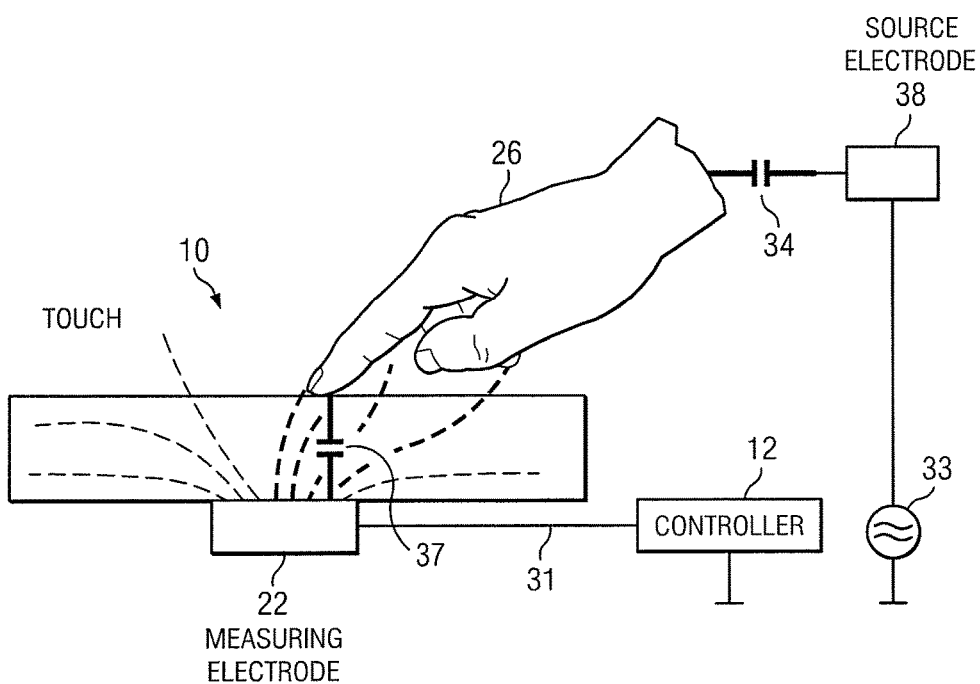
FIGS. 3 through 5 illustrate a portion of the example device of FIG. 1 configured according to an object-identification mode of operation.

FIG. 3 illustrates one embodiment of a portion of the touch sensor 10 of FIG. 1 that includes at least one electrode 22 configured for use in identifying the touch object 26 according to an object-identification mode of operation. While operating in an object-identification mode, touch sensor 10 may be configured to identify which touch object 26 is touching touch sensor 10 at a particular position. In certain embodiments, touch sensor 10 is configured to identify the touch object 26 at least in part by using controller 12 to measure or estimate the mutual capacitance 37 between at least one electrode 22 included within touch sensor 10 and a source electrode 38 external to touch sensor 10.

In particular embodiments, mutual capacitance 37 is measured or estimated when touch object 26 is capacitively connected both to measuring electrode 22 and source electrode 38 and when a signal source 33 provides a signal (e.g. signal 52 of FIG. 5) to source electrode 38. The signal provided to source electrode 38 may induce a charge through touch object 26 that is sensed by an electrode 22. Controller 12 may use the charge accumulated on measuring electrode 22 to measure or estimate mutual capacitance 37. If touch object 26 is capacitively coupled to signal source 33 through source electrode 38, the presence of a touch object 26 may increase, rather than decrease, the mutual capacitance 37 that is measured or estimated during the object-identification mode of operation, as explained further with reference to FIGS. 4 through 6.

In particular embodiments, one or more of the electrode(s) 22 used in identifying the touch object during the object-identification mode of operation may be the same as the electrode(s) 22 used during the position-detection mode of operation. For example, electrode 22a may be used as a drive electrode 22 during the position-detection mode of operation and as a sense electrode 22 during the object-identification mode of operation. Additionally or alternatively, electrode 22b may be used as a sense electrode 22 during the position-detection mode of operation and as a sense electrode 22 during the object-identification mode of operation.

As explained further below, source electrode 38 may be embedded in a device that facilitates the capacitive coupling of source electrode 38 to measuring electrode 22 through touch object 26. If touch object 26 is the hand of a user or a stylus held by the user, for example, source electrode 38 may be embedded in a chair supporting the user or in a wristwatch worn by the user.

Certain signals provided by signal source 33 to source electrode 38 may be a current or voltage in the form of a pulse, a square wave, a sinusoidal wave, or other form of periodic oscillation; however, other signals may not have periodic oscillation. Each change of the voltage applied to source electrode 38 may result in the transfer of charges on electrode 22. In certain embodiments, the charges transferred on electrode 22 are sampled by following a sequence of switching on and off one or more suitable analog switches (e.g. to transfer the charge to one or more sampling capacitors). In a particular embodiment, controller 12 may be provided (or may generate) a control sequence that is used to operate analog switches around its sampling capacitor(s). When mutual capacitance 37 is measured during the object-identification mode, the control sequence may be synchronized with the signal provided to source electrode 38. In certain embodiments, signal source 33 provides a high frequency signal and mutual capacitance 37 is measured by measuring the amplitude on the induced signal over measuring electrode 22; however, any suitable frequency may be used.

In certain embodiments, multiple touch objects 30 (e.g. multiple users) may be in proximity to touch sensor 10 and may be enabled to interact with touch sensor 10 substantially simultaneously. If multiple touch objects 26 are in proximity to touch sensor 10 and are capacitively or galvanically to their respective source electrodes 38, the touch object 26 touching a particular position of touch sensor 10 may be identified, for example, by determining whether the maximum mutual capacitance 37 measured at that position is greater than a predetermined threshold and associating that measurement with a paired touch object 26 and source electrode 38. Using a predetermined threshold may, in certain instances, mitigate the risk of incorrectly identifying the touch object. For example, if two or more touch objects 26 are touching touch sensor 10 simultaneously but none of those touch objects 26 are capacitively coupled to their respect source electrodes 38, then the maximum mutual capacitance 37 measured may be less than a predetermined threshold, which may indicate that the touch objects are not capacitively coupled to their respective source electrodes.

In addition to mutual capacitance 37, FIG. 3 includes various other nodes 31 and 34. Node 31 indicates a parasitic capacitance that may, in certain instances, influence the signal-to-noise ratio in the mutual capacitance 37 measurements of touch sensor 10. In certain instances, the parasitic capacitance may be larger than the measured mutual capacitance 37; however, the parasitic capacitance may be substantially lower than the measured mutual capacitance 37. In particular embodiments, there is a direct relationship between maintaining a lower parasitic capacitance and achieving a higher signal-to-noise ratio in the mutual capacitance 37 measurements of touch sensor 10. Node 34 represents the capacitive or galvanic coupling between signal source 33 and touch object 26. As discussed above, node 37 represents the mutual capacitance from source electrode 38 through touch object 26 to measuring electrode 22.

Figure 4:
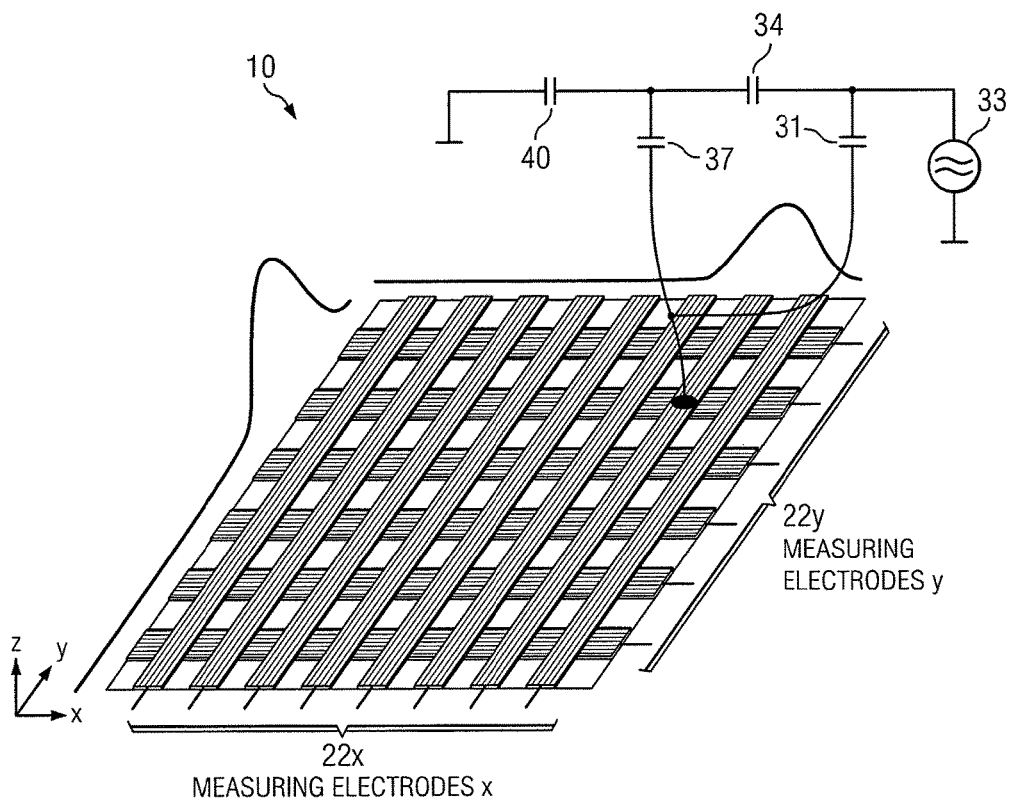

FIG. 4 illustrates one example embodiment of touch sensor 10 having a grid of the measuring electrodes 22 of FIG. 3, together with an example equivalent schematic representing various nodes 31, 34, 37, and 40. As shown in FIG. 4, touch sensor 10 may include multiple measuring electrodes 22 arranged substantially parallel to an x-axis and multiple measuring electrodes 22 arranged substantially parallel to a y-axis. In certain embodiments, the x-axis may be not be parallel to the y-axis (e.g. the x-axis may be rotated with respect to the y-axis about an angle of approximately 90 degrees, 120 degrees, 130 degrees, or any other suitable angle). The measuring electrodes 22 may collectively form a substantially two-dimensional grid configuration. A z-axis indicates the magnitude of mutual capacitance 37 between source electrode 38 and one or more measuring electrodes 22. The touch object 26 may capacitively couple measuring electrode 22 to signal source 33 through nodes 37 and 34. Node 40 indicates the capacitive coupling between touch object 26 and ground. A stronger capacitive coupling of touch object 26 to ground through node 40 may, in certain instances, decrease the charge transfer efficiency and may negatively impact the measured signals.

As discussed above with reference to FIG. 3, touch sensor 10 may be configured to identify touch objects 26 by measuring the mutual capacitance 37 between a measuring electrode 22 included within touch sensor 10 and a source electrode 38 external to touch sensor 10. In certain instances, the identification may involve mutual capacitance 37 measurements between each of multiple measuring electrodes 22 and source electrode 38. The measuring electrodes 22 used in identifying each touch object 26 may include all the measuring electrodes of touch sensor 10. Alternatively, the measuring electrodes 22 used in identifying which touch object 26 is touching a detected touch position may include a subset, but not all, of the measuring electrodes 22 included within touch sensor 10. For example, the measuring electrodes 22 used may be localized to an area of touch sensor 10 corresponding to the detected touch position.

Although the example touch sensor 10 of FIG. 4 is configured as a rectangular grid, other configurations are within the scope of the invention, such as a touchwheel, a linear slider, buttons with reconfigurable displays, and other such configurations. Redundant fine line metal electrodes to provide open fault resiliency can be applied to any such configuration, and the invention is not limited to the example configurations presented here.

Figure 5:
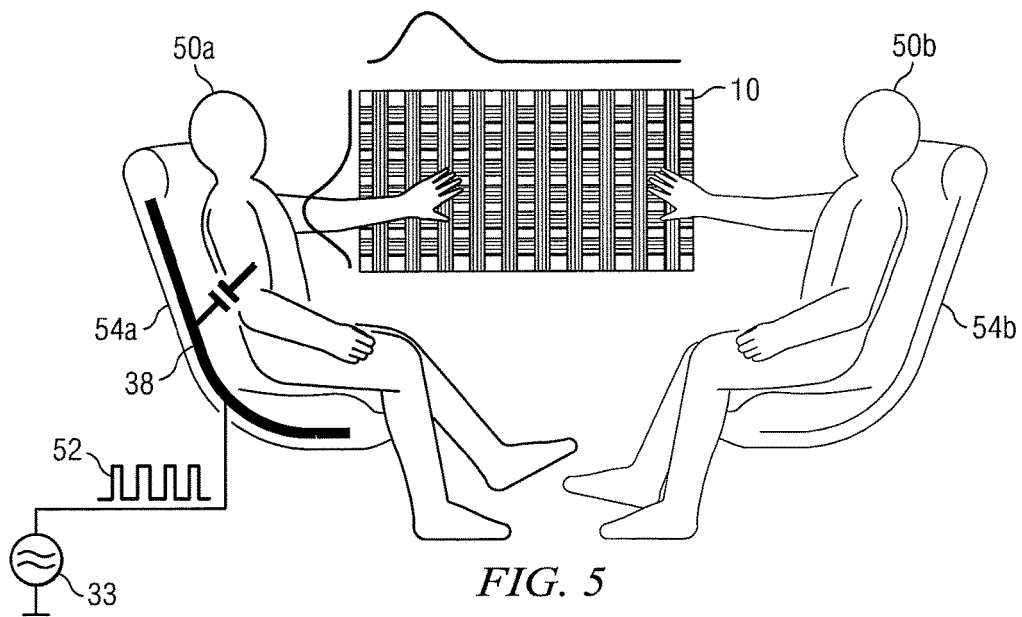

FIG. 5 illustrates one example implementation of touch sensor 10. In the illustrated embodiment, one or more users 50 are each sitting in a respective chair 54 and are each enabled to interact substantially simultaneously with touch sensor 10 (e.g. using a body part or a tool, such as a stylus). In certain embodiments, touch sensor 10 may be accessible to users 50 located in a room (e.g. lounge, restaurant, waiting room, conference room, command and control center, etc.), a vehicle (e.g. car, train, bus, subway car, boat, airplane, etc.), or at any other suitable location. If touch sensor 10 is located in a vehicle, for example, users 50 may be enabled to interact with touch sensor 10 regardless of whether the vehicle is in motion or at rest.

Each chair 54 generally refers to any suitable device that may be physically coupled to a user 50. Although in the illustrated example chair 54 is a seat having a surface designed to physically accommodate a substantial portion of the body of user 50a, certain alternative embodiments may use a smaller device in place of chair 54, such as, for example, a wristwatch or a stylus.

In certain embodiments, each chair 54 supporting a user 50 may include one or more respective source electrodes 38. As shown in FIG. 5, for example, chair 54a includes one or more source electrodes 38 embedded therein. Chair 54b may include one or more similar source electrodes 38. Certain source electrodes 38 may be made from flexible conductive material, such as, for example, conductive rubber, metal wire, carbon fibers, or other flexible conductive material. In alternative embodiments, however, electrodes 38 may be made from conductive material that does not readily bend or flex. For example, electrodes 38 may each include a solid conductive plate. Certain source electrodes 38 may be configured to have a resistance that is substantially less than 40 kOhm. Particular source electrodes 38 may have little to virtually no resistance, which in certain instances may facilitate measuring the mutual capacitance 37. Although FIG. 5 shows that each user 50 is seated in a respective chair 54, in alternative embodiments several users 50 may be capacitively coupled to the same source electrode 38.

In particular embodiments, source electrode 38 may be at least partially covered with a dielectric material (e.g. soft foam, cotton, etc.). In certain instances, one or more dielectric materials may be used that has a higher dielectric constant, which may increase the equivalent dielectric constant of the dielectric material and thus increase the signal injected into measuring electrode 22. To increase the dielectric constant of the material(s) used, in certain instances, small conductive particles (e.g. metal dust, metal flakes, etc.) may be added to the dielectric material(s) (e.g. in close proximity to source electrode 38).

In certain instances, the capacitive coupling between each source electrode 38 and its respective user 50 may be directly related to the size of the source electrode 38 and inversely related to the distance between the source electrode 38 and its user 50. For example, increasing the size of source electrode 38 may increase the capacitive coupling between the source electrode 38 and the body of a user 50, and thus directly increase the transferred charge between signal source 33 and the measuring electrodes 22 of touch sensor 10. In addition, a thinner dielectric between the source electrode 38 and the body of a user 50 may increase the capacitive coupling between the source electrode 38 and the body of a user 50, and thus directly increase the transferred charge between signal source 33 and the measuring electrodes 22 of touch sensor 10. A higher voltage applied to source electrode 38 by signal source 33 may also directly increase the transferred charge between signal source 33 and the measuring electrodes 22 of touch sensor 10. For example, high voltage drivers may be used to increase the amplitude on the signal source electrodes 38. In certain vehicle implementations, each source electrode 38 may be well insulated from the vehicle chassis and from other electric circuits.

In operation, certain signals 52 may be provided from signal source 33 to touch sensor 10 through touch objects 26, such as through the body of each user 50. The provision of signals through each user 50 from signal source 33 may, in certain embodiments, facilitate distinguishing one touch object from another, as explained further below with reference to FIG. 6. In certain embodiments, touch sensor 10 (or a controller thereof, such as controller 12 or 26) may control the provision of signals to source electrodes 38 by signal source 33. Particular touch sensors 10 may include one or more signal sources 33. Alternatively, certain signal sources 33 may be external to touch sensor 10 and may be configured to provide signals synchronized with a controller of touch sensor 10.

In certain instances, touch sensor 10 may be capable of detecting whether a user 50 who touched an active area of touch sensor 10 is seated in his or her chair 54 (e.g. based on a mutual capacitance 37 measurement), as discussed above. Touch sensor 10 may, in certain embodiments, selectively enable or disable certain commands based on a determination regarding whether one or more users 50 are not capacitively coupled to their respective source electrodes 38 in chair 54, which may enhance the safety of the user 50 in particular applications.

Figure 6:
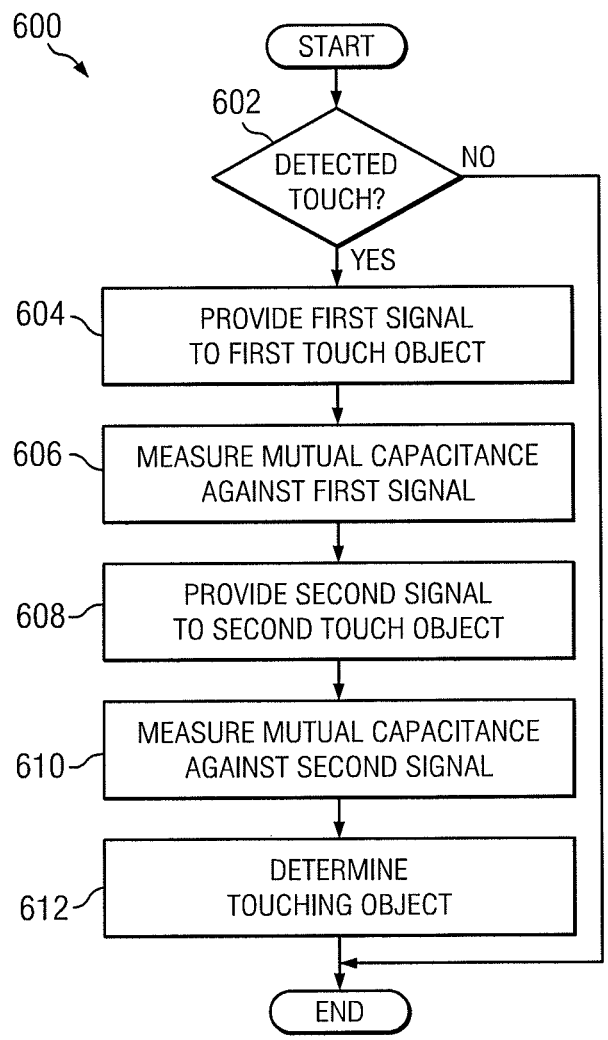
FIG. 6 illustrates an example flowchart that may be used by certain embodiments to detect touch positions and to distinguish one touch object from another.

FIG. 6 illustrates an example flowchart 600 that may be used in certain embodiments of touch sensor 10 to detect touch positions and to distinguish one touch object 26 from another. In operation 602, a determination is made regarding whether one or more touches are detected. If one or more touches are detected, the touch position(s) may be calculated in a manner substantially similar to that discussed above and/or using any other suitable location-determining method. If there are no detected touches, then flowchart 600 may end.

In operation 604, a signal source 33 capacitively or galvanically coupled to one of a plurality of touch objects 26 through source electrodes 38 provides a signal to a first one of those touch objects 26. As shown in FIG. 5, for example, signal source 33 may provide a first signal 52 to one or more source electrodes 38 disposed within chair 54a where user 50a is sitting, while one or more other source electrodes 38 disposed within chair 54b where user 50b is sitting are not provided the same first signal 52. In certain instances, first signal 52 may be synchronized with a signal provided (or generated) by touch sensor 10 and used by touch sensor 10 in controlling the timing of its measurements.

In operation 606, the mutual capacitance 37 is measured between at least a portion of a grid of measuring electrodes 22 of touch sensor 10 and the electrode(s) in chair 54a emitting the first signal 52. In certain instances, the greatest mutual capacitance 37 between source electrode 38 of chair 54a and measuring electrode(s) 22 may coincide with the position(s) touched by user 50a, even if user 50b is touching touch sensor 10 at substantially the same time (e.g. at different position). Certain embodiments may measure all measuring electrodes 22 against the first signal provided by signal source 33 through the source electrode(s) 38 in chair 54a. Alternatively, certain embodiments may measure only the mutual capacitance 37 in the detected touch positions (e.g. determined in operation 602) against the first signal 52. That is, in certain instances, the determination of the touching object 26 may be made using a lower resolution than the resolution used to detect the touch position of that touching object 26.

In operation 608, a signal source 33 capacitively coupled to one or more of a plurality of touch object 26 provides a second signal to a second one of those touch objects different from the first one of those touch objects. As shown in FIG. 5, for example, signal source 33 (or a different signal source) may provide a second signal to one or more source electrodes 38 disposed within the chair 54b where user 50b is sitting, while the source electrode(s) 38 disposed within chair 54a where user 50a is sitting is not provided the same second signal. The second signal provided to the source electrode(s) 38 disposed within chair 54b may, in certain instances, signal provided (or generated) by touch sensor 10 and used by touch sensor 10 in controlling the timing of its measurements.

In operation 610, the mutual capacitance 37 is measured between a grid of measuring electrodes 22 of touch sensor 10 and the source electrode(s) 38 in chair 54b emitting the second signal. In certain instances, the greatest mutual capacitance 37 between source electrode 38 of chair 54b and measuring electrode(s) 22 may coincide with the position(s) touched by user 50b, even if user 50a is touching touch sensor 10 at substantially the same time (e.g. at different position). Certain embodiments may measure all measuring electrodes 22 against the second signal provided by signal source 33 through the electrode(s) in chair 54b. Alternatively, certain embodiments may measure only the mutual capacitance in the detected touch positions (e.g. determined in operation 602) against the second signal.

In operation 612, determinations may be made regarding which detected touch position corresponds to which touch object 26 (or which user 50). In certain instances, the determination may be based on information generated during one or more of the operations 602-610. For example, if the mutual capacitance 37 measured in operation 606 is greater than the mutual capacitance 37 measured in operation 610 and is greater than a predetermined threshold, touch sensor 10 may determine that the touching object 26 corresponding to the position detected in operation 602 is the first touch object 26. Alternatively, if the mutual capacitance 37 measured in operation 606 is less than the mutual capacitance 37 measured in operation 610 and is also greater than a predetermined threshold, touch sensor 10 may determine that the touching object 26 corresponding to the position detected in operation 602 is the second touch object 26. If the mutual capacitance 37 measured in operations 606 and 610 are each less than a predetermined threshold, a determination may be made that there is insufficient electrical connection between signal source 33 and source electrodes 38. If touch sensor 10 determines that there is insufficient electrical connection between signal source 33 and source electrodes 38, then touch sensor 10 may not provide an identification of the touching object 26.

Accordingly, example embodiments disclosed herein may facilitate distinguishing one touch object from another in addition to determining the touch positions of those touch objects. Certain applications may benefit from this information in a variety of ways. For example, certain applications may use this information to dynamically adapt the behavior of a touch screen based at least in part on who is touching the touch screen.

Although the preceding examples given here generally rely on self capacitance or mutual capacitance to operate, other embodiments of the invention will use other technologies, including other capacitance measures, resistance, or other such sense technologies.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   during a position-detecting mode, determining, independent of an electrode external to a touch sensor, a position of a touch object touching the touch sensor; and
   during an object-identification mode, in response to determining the position of the touch object:
      conducting a first signal to a first source electrode external to the touch sensor, the first source electrode capacitively coupled to a first measuring electrode of a plurality of measuring electrodes of the touch sensor through the touch object;
      measuring a mutual capacitance between the first source electrode and the first measuring electrode while conducting the first signal;
      conducting a second signal to a second source electrode external to the touch sensor, the second source electrode capacitively coupled to a second measuring electrode of the plurality of measuring electrodes of the touch sensor through a second touch object;
      measuring a mutual capacitance between the second source electrode and the second measuring electrode while conducting the second signal; and
      determining the touch object touching the touch sensor at the determined position by comparing the measured mutual capacitance between the first source electrode and the first measuring electrode with the measured mutual capacitance between the second source electrode and the second measuring electrode and selecting the touch object based on the relative magnitude of the measured mutual capacitance between the first source electrode and the first measuring electrode and the measured mutual capacitance between the second source electrode and the second measuring electrode.

2. The method of claim 1, wherein the first measuring electrode is a drive electrode during the position-detection mode and is a sense electrode during the object-identification mode.

3. The method of claim 1, further comprising tracking, during the position-detection mode, a change in the determined position of the touch object.

4. An apparatus comprising:
   a substrate;
   a plurality of sense electrodes distributed across an active touch screen area of the substrate; and
   a controller configured to:
      during a position-detecting mode, determine, independent of an electrode external to a touch sensor, a position of a touch object touching the active touch screen; and
      during an object-identification mode, in response to determining the position of the touch object, determine the touch object touching the active touch screen area at the determined position by:
         comparing a measured mutual capacitance between a first source electrode and a first measuring electrode, the first source electrode capacitively coupled to the touch screen area through a first touch object, with a measured mutual capacitance between a second source electrode and a second measuring electrode, the second source electrode capacitively coupled to the touch screen area through a second touch object; and
         determining the touch object based on the relative magnitude of the measured mutual capacitance between the first source electrode and the first measuring electrode and the measured mutual capacitance between the second source electrode and the second measuring electrode.

5. The apparatus of claim 4, further comprising a signal generator configured to induce charge through mutual capacitance, at least in part, by providing the signal to the first source electrode.

6. The apparatus of claim 4, wherein the first source electrode is embedded in a chair.

7. The apparatus of claim 6, wherein the chair is disposed within a vehicle.

8. The apparatus of claim 6, wherein the chair is disposed within a room.

9. The apparatus of claim 4, wherein the first source electrode is embedded in a stylus.

10. A system comprising:
- a signal source configured to time-multiplex a signal among each of a plurality of source electrodes, such that only one of the source electrodes is provided the signal at a time;
- a plurality of chairs each comprising a respective one of the plurality of source electrodes; and
- a touch sensor comprising a plurality of measuring electrodes, the touch sensor configured to:
    - during a position-detecting mode, determine, independent of an electrode external to a touch sensor, a position of a touch object; and
    - during an object-identification mode, in response to determining the position of the touch object, determine the touch object touching the touch sensor at the determined position by:
        - comparing a measured mutual capacitance between a first source electrode of the plurality of source electrodes and a first measuring electrode of the plurality of measuring electrodes, the first source electrode capacitively coupled to the touch sensor through a first touch object, with a measured mutual capacitance between a second source electrode of the plurality of source electrodes and a second measuring electrode of the plurality of measuring electrodes, the second source electrode capacitively coupled to the touch sensor through a second touch object; and
        - determining the touch object based on the relative magnitude of the measured mutual capacitance between the first source electrode and the first measuring electrode and the measured mutual capacitance between the second source electrode and the second measuring electrode.

11. The system of claim 10, further comprising a controller configured to synchronize a timing of the respective mutual capacitance measurement with the signal time-multiplex among each of the plurality of source electrodes.

12. The system of claim 10, wherein the system is disposed within a vehicle.

13. The system of claim 10, wherein the system is disposed within a room.

14. The system of claim 10, wherein the touch sensor is further configured to determine the touch object touching the touch sensor based at least in part on a determination that the respective mutual capacitance measurement between at least the measuring electrode and one of the plurality of source electrodes is greater than a predetermined threshold.

15. The system of claim 10, wherein at least a portion of each source electrode is disposed inside one or more of a back of its respective chair, a base of its respective chair, and a handle of its respective chair.

16. The system of claim 10, wherein each source electrode comprises non-flexible conductive material at least partially covered in a dielectric material.

17. The system of claim 10, wherein each source electrode comprises flexible conductive material.

* * * * *